United States Patent Office 2,892,856
Patented June 30, 1959

2,892,856

TRIVINYLTIN HYDROXIDE AND METHOD OF PREPARATION

Hugh E. Ramsden, Scotch Plains, and Sanders D. Rosenberg, North Plainfield, N.J., assignors to Metal & Thermit Corporation, Rahway, N.J., a corporation of New Jersey No Drawing. Application September 18, 1956
Serial No. 610,666

8 Claims. (Cl. 260—429.7)

The present invention relates to a novel compound, trivinyltin hydroxide, and to the preparation thereof.

It is an object of the present invention to provide a novel organotin compound, trivinyltin hydroxide.

Another object of the invention is to provide a process for preparing trivinyltin hydroxide.

Other objects and advantages will become apparent from the following description.

Generally speaking, the present invention contemplates the preparation of trivinyltin hydroxide by reacting trivinyltin chloride or trivinyltin bromide with a basic compound in an aqueous solution, in accordance with the following equations:

(1)
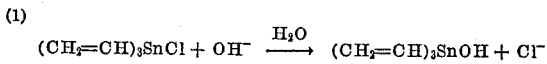

(2)
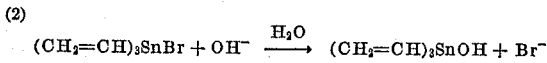

The aqueous solution must contain sufficient hydroxide ions to replace all the halogen with hydroxide. To obtain good yields an excess of hydroxide ions should be present.

The bases that are utilized must ionize in an aqueous solution, and include sodium hydroxide, sodium carbonate, sodium bircarbonate, potassium hydroxide, potassium carbonate, potassium bicarbonate, ammonium hydroxide, aniline, pyridine, morpholine, tetraalkyl-ammonium hydroxides, calcium oxide and hydroxide, barium hydroxide, etc.

The trivinyltin halide may be mixed with the aqueous solution in the pure form, or it may be in solution with an inert hydrocarbon solvent such as benzene, toluene, xylene, light petroleum fractions such as pentane, hexane, heptane, or cyclohexane, or other solutions such as alcohols, ethers, etc. which will not react irreversibly with the trivinyltin halide, or cause the vinyl groups to self-react, e.g., cleave, rearrange or polymerize. The reaction is preferably carried out by slowly adding the trivinyltin halide (alone or in solution, per the preceding sentence) to the aqueous basic solution, with good agitation. The temperatures employed may be as low as −5 to −10° C. and as high as the reflux temperature of the reaction mixture, preferably a maximum temperature will be maintained at not more than about 150° C. An inert atmosphere, preferably a nitrogen atmosphere which is more economical, is preferred during the reaction, although it is not necessary.

Trivinyltin hydroxide is a solid material.

The following example is further illustrative of the present invention. It is to be understood, however, that the invention is not restricted to the specific embodiments described herein in detail.

*Example 1.—Trivinyltin hydroxide*

In a 500 milliliter flask was placed 25 grams of sodium hydroxide in 300 grams of water. To this was added 100 grams (0.425 mole) of trivinyltin chloride, over a half hour period. The reaction was carried out under a nitrogen atmosphere. The temperature rose from 30° C. to 45° C. The reaction mixture was then stirred for one hour and the temperature dropped to 32° C. The solid was filtered off under a nitrogen stream and was dried by obtaining a partial vacuum with a water aspirator in a closed system while feeding in nitrogen. This drying operation was carried out for one hour. The solid weighed 92 grams, and had the following analysis. Analyzed: Sn, 41.32; $H_2O_{KF}$, 27.21. Calculated for $(CH_2=CH)_3SnOH \cdot 4H_2O$: Sn, 41.05; $H_2O$, 24.95. Calculated for $(CH_2=CH)_3SnOH$: Sn, 54.75.

The solid was then vacuum dried on potassium hydroxide pellets in a desiccator for 90 hours. The dried trivinyltin hydroxide weighed 68 grams and had the following analysis: Sn, 53.11; M.P. 67.5° C.–69° C.

Similarly, trivinyltin hydroxide is prepared by hydrolysis of trivinyltin bromide in an aqueous solution.

Although alkyl and aryl tin compounds have been known for many years and have found many and substantial uses in industry, it has not heretofore been possible to utilize them in polymerization reactions as a component of the vinyl polymer. Trivinyltin hydroxide will copolymerize with other monomers containing unsaturated linkages, such as vinyl chloride, styrene, vinyl silanes, methyl methacrylate, acrylates, etc. The copolymers thus produced are novel.

In addition to the outstanding utility of trivinyltin hydroxide as a monomer utilized in the preparation of copolymers, trivinyltin hydroxide has other important uses. Trivinyltin hydroxide is an effective biocidal agent, toxic to fungi, bacteria, microorganisms generally, spores, etc., and is useful as a preservative for material subject to attack by such organisms, said material including leather, wood, pulp systems, cloth, paper, plastics, etc. It is also useful as a stabilizer for polyvinyl chloride and as an intermediate for the preparation of other organotin compounds which function as polyvinyl chloride stabilizers. Thus, one or both of the unsaturated linkages in trivinyltin hydroxide may be epoxidized to yield the epoxyethyl tin hydroxides which function as polyvinyl chloride resin stabilizers.

While the invention has been described with particular reference to specific embodiments, it is to be understood that it is not limited thereto but is to be construed broadly and restricted solely by the scope of the appended claims.

What is claimed is:

1. Trivinyltin hydroxide.
2. A process for preparing trivinyltin hydroxide comprising hydrolyzing in a basic medium a compound selected from the class consisting of trivinyltin chloride and trivinyltin bromide.
3. A process for preparing trivinyltin hydroxide comprising mixing a halide selected from the class consisting of trivinyltin chloride and trivinyltin bromide with a basic aqueous solution to yield trivinyltin hydroxide.
4. The process as described in claim 3, in which the trivinyltin hydroxide is recovered from the aqueous solution.
5. The process as described in claim 3, in which the halide is trivinyltin chloride.

6. The process for preparing trivinyltin hydroxide comprising mixing a halide selected from the class consisting of trivinyltin bromide and trivinyltin chloride with a basic substance in an aqueous solution.

7. A process for the preparation of trivinyltin hydroxide which comprises mixing an aqueous solution of sodium hydroxide with trivinyltin chloride, allowing these compounds to react and recovering from the reaction mixture trivinyltin hydroxide.

8. A process for the preparation of trivinyltin hydroxide which comprises mixing an aqueous solution of sodium hydroxide with trivinyltin bromide, allowing the compounds to react and recovering from the reaction mixture trivinyltin hydroxide.

References Cited in the file of this patent

Report on "Organo-Tin Compounds," Nat'l Defense Research Committee, March 2, 1942 (declassified January 28, 1946), pp. 5–6.